(12) United States Patent
Jung et al.

(10) Patent No.: US 9,043,596 B2
(45) Date of Patent: May 26, 2015

(54) METHOD AND APPARATUS FOR AUTHENTICATING PUBLIC KEY WITHOUT AUTHENTICATION SERVER

(75) Inventors: Bae-eun Jung, Seongnam-si (KR); Tae-sung Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 799 days.

(21) Appl. No.: 12/830,033

(22) Filed: Jul. 2, 2010

(65) Prior Publication Data

US 2011/0191586 A1 Aug. 4, 2011

(30) Foreign Application Priority Data

Feb. 4, 2010 (KR) ........................ 10-2010-0010479

(51) Int. Cl.
*H04L 9/32* (2006.01)
*G06F 21/00* (2013.01)
*H04L 9/00* (2006.01)
*H04L 9/08* (2006.01)

(52) U.S. Cl.
CPC ................ *H04L 9/32* (2013.01); *H04L 9/0844* (2013.01); *H04L 9/3273* (2013.01)

(58) Field of Classification Search
CPC ..... G06F 21/85; H04L 63/061; H04L 9/0825; H04L 9/3236
USPC ............. 380/30, 277, 286, 44, 285; 713/168, 713/169, 170, 171, 156
See application file for complete search history.

(56) References Cited

U.S. PATENT DOCUMENTS 6,192,474 B1  2/2001  Patel et al.
(Continued)

FOREIGN PATENT DOCUMENTS

| KR | 10-2007-0096073 A | 10/2007 |
| KR | 10-2007-0105826 A | 10/2007 |
| KR | 10-2007-0107160 A | 11/2007 |

OTHER PUBLICATIONS

Du. W., Wang, R., Ning, P., "An efficient scheme for authenticating public keys in sensor networks", MobiHoc '05 Proceedings of the 6th ACM international symposium on Mobile ad hoc networking and computing; 2005. pp. 58-67. [retrieved from ACM database on Jun. 7, 2012].*

Gehrmann, Mitchell, Nyberg. "Manual authentication for wireless devices"; RSA Cryptobytes, vol. 7, No. 1, pp. 2937, 2004. [retrieved from Citeseer database on Jun. 7, 2012].*

(Continued)

*Primary Examiner* — Saleh Najjar
*Assistant Examiner* — Feliciano Mejia
(74) *Attorney, Agent, or Firm* — Sughrue Mion, PLLC

(57) ABSTRACT

Provided is a method in which a first device authenticates a public key of a second device. The method includes: receiving a first value generated based on the public key of the second device and a password displayed on a screen of the second device and the public key of the second device, from the second device; generating a second value based on the public key of the second device and a password input to the first device by a user of the first device according to the password displayed on the screen of the second device; and authenticating the public key of the second device based on the first value and the second value.

21 Claims, 6 Drawing Sheets

(56) References Cited

U.S. PATENT DOCUMENTS

| | | | |
|---|---|---|---|
| 7,142,674 B2 * | 11/2006 | Brickell | 380/44 |
| 7,694,136 B2 * | 4/2010 | Peyravian et al. | 713/168 |
| 7,739,513 B2 * | 6/2010 | Iwamura | 713/183 |
| 7,899,188 B2 * | 3/2011 | Abu-Amara | 380/282 |
| 7,912,788 B2 * | 3/2011 | Athens et al. | 705/60 |
| 8,037,294 B2 * | 10/2011 | Nochta | 713/150 |
| 8,176,328 B2 * | 5/2012 | Chen et al. | 713/176 |
| 8,185,744 B2 * | 5/2012 | Brown et al. | 713/180 |
| 2002/0186846 A1 | 12/2002 | Nyberg et al. | |
| 2004/0054897 A1 * | 3/2004 | Dawson et al. | 713/168 |
| 2004/0064699 A1 * | 4/2004 | Hooker et al. | 713/170 |

OTHER PUBLICATIONS

Dirk Balfanz, D. K. Smetters, Paul Stewart, and H. Chi Wong; "Talking to Strangers: Authentication in Ad-Hoc Wireless Networks" In Symposium on Network and Distributed Systems Security (NDSS 2002), Feb. 2002. [retrieved from Citeseer database on Jun. 7, 2012].*

Nitesh Saxena, et al., Secure Device Pairing based on a Visual Channel (Short Paper), 1081-6011/06, 2006, IEEE, 6 pages.

Serge Vaudenay, Secure Communications over Insecure Channels Based on Short Authenticated Strings, 18 pages.

* cited by examiner

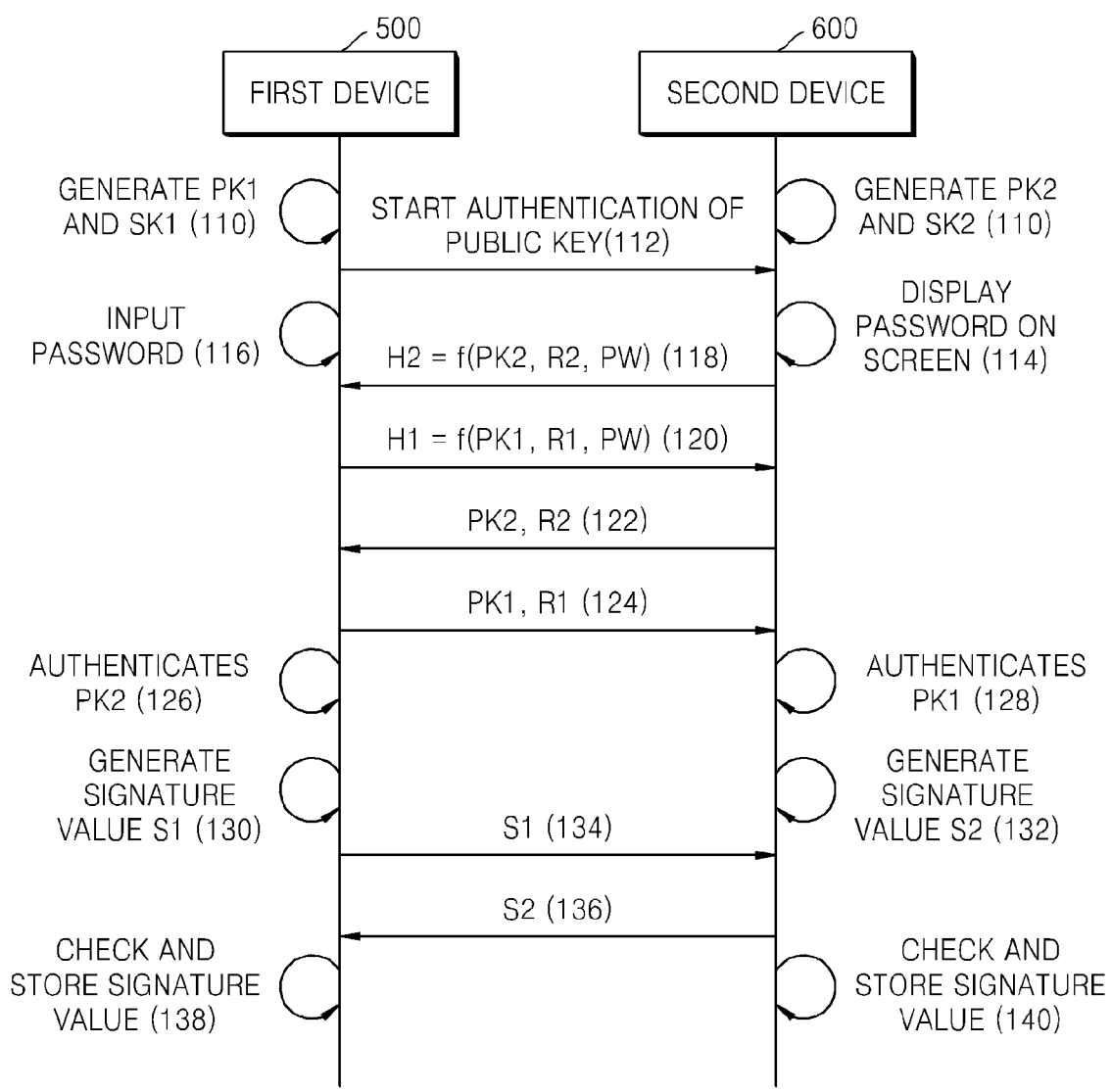

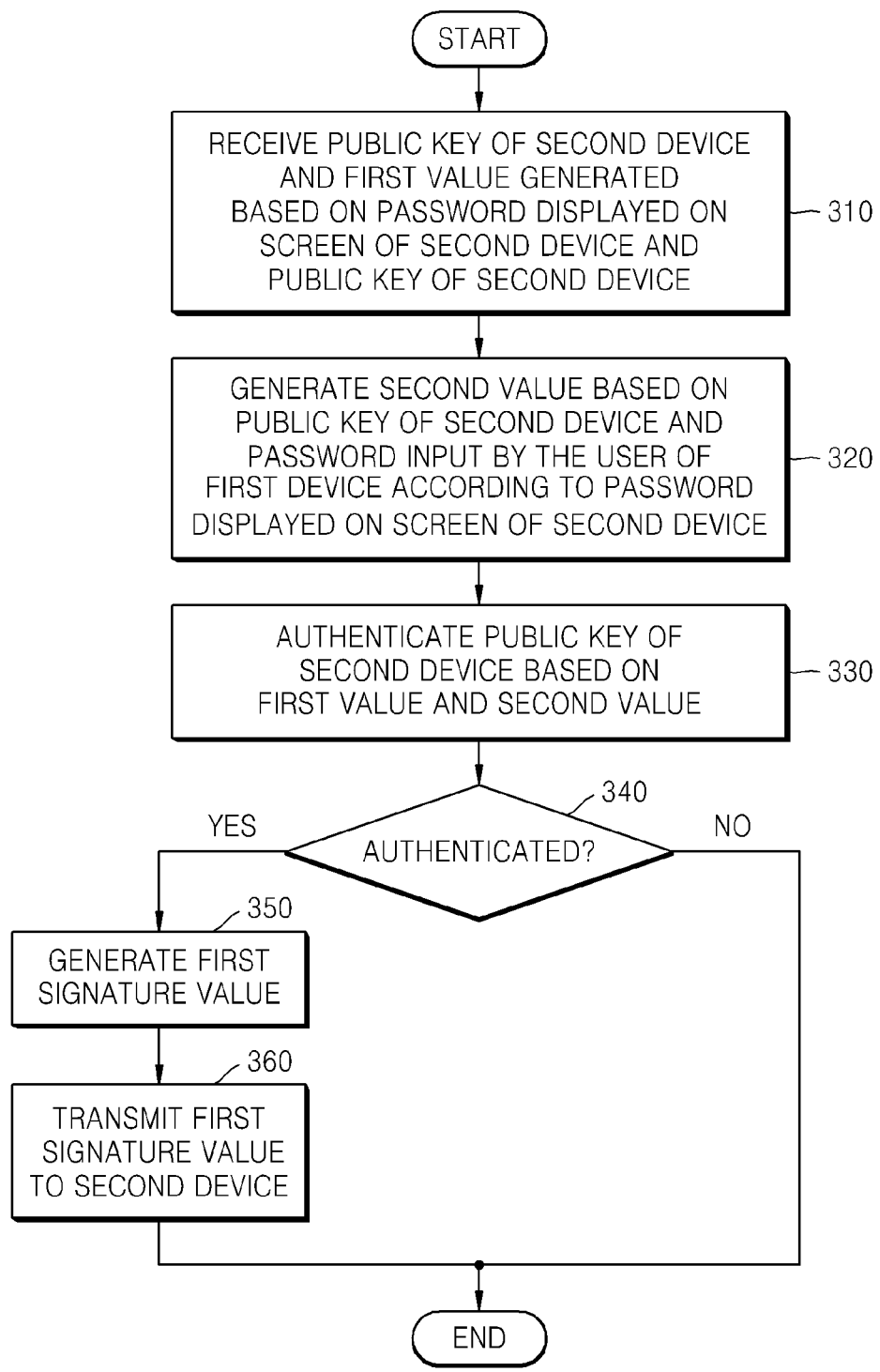

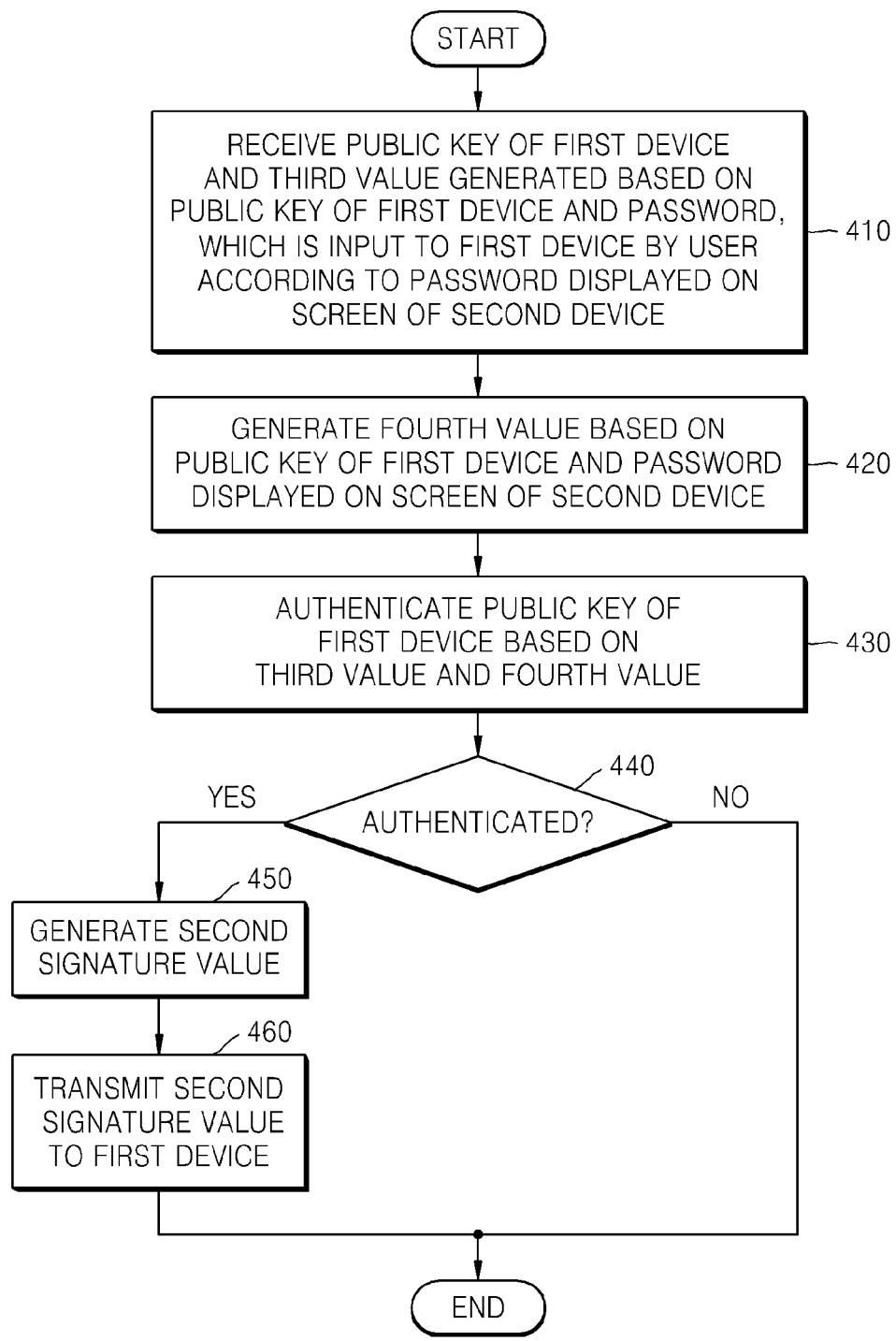

METHOD AND APPARATUS FOR AUTHENTICATING PUBLIC KEY WITHOUT AUTHENTICATION SERVER

CROSS-REFERENCE TO RELATED PATENT APPLICATION

This application claims priority from Korean Patent Application No. 10-2010-0010479, filed Feb. 4, 2010, in the Korean Intellectual Property Office, the disclosure of which is incorporated herein in its entirety by reference.

BACKGROUND

1. Field

Apparatuses and methods consistent with exemplary embodiments relate to authenticating a public key, and more particularly, to authenticating a public key without an authentication server.

2. Description of the Related Art

Transmission and reception of data through a wired/wireless network is performed between remote devices, and thus, is exposed to the danger of security breach. Security concerns, such as hacking or tapping, generally arise in connection with the devices that do not have authority to transmit or receive data. One method for improving the security concerns is to use a security key. In this method, data is encoded using the security key and can be decoded only by a device that knows the security key. A symmetric key method or an asymmetric key method may be used as an algorithm to generate a security key. In the asymmetric key method, an encryption key used to encode data and a decryption key used to decode the encoded data use different methods, and data is encoded and decoded using a public key and a personal key corresponding to the public key.

In the asymmetric key method, a public key needs to be authenticated as is a public key of a specific device. For example, by authenticating that a public key A is a public key of a device A, a device B communicating with the device A can decode data received from the device A using the public key A. However, a public key infrastructure needs an additional server for performing authentication, that is, a certificate authority to authenticate a public key.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

One or more exemplary embodiments provide a method and apparatus for authenticating a public key without an authentication server.

One or more exemplary embodiments provide a computer readable recording medium having embodied thereon a computer program for executing the method.

According to an aspect of an exemplary embodiment, there is provided a method in which a first device authenticates a public key of a second device, the method including: receiving a first value generated on the basis of the public key of the second device and a password displayed on a screen of the second device, and the public key of the second device from the second device; generating a second value on the basis of the public key of the second device and a password input to the first device by a user of the first device according to the password displayed on the screen of the second device; and authenticating the public key of the second device on the basis of the first value and the second value.

The first value may be a first hash value generated by applying a predetermined hash function to a bitstream in which the password displayed on the screen of the second device, the public key of the second device, and a predetermined random number are concatenated with one another; and the receiving of the first value may further include receiving the predetermined random number from the second device.

The second value may be a second hash value generated by applying the hash function to a bitstream formed by concatenating the password input to the first device by the user of the first device, the public key of the second device, and the predetermined random number received from the second device with one another.

The method may further include: selectively generating a first signature value for an electronic signature on the basis of the authenticated public key of the second device and a personal key corresponding to the public key of the first device, according to a result of the authenticating; and transmitting the generated first signature value to the second device.

According to an aspect of another exemplary embodiment, there is provided a method in which a second device authenticates a public key of a first device, the method including: receiving a third value generated on the basis of a public key of the second device and a password input to the first device by a user of the first device according to a password displayed on a screen of the second device, and the public key of the first device from the first device; generating a fourth value on the basis of the public key of the first device and the password displayed on the screen of the second device; and authenticating the public key of the first device on the basis of the third value and the fourth value.

According to an aspect of another exemplary embodiment, there is provided an apparatus for authenticating a public key of a first device for authenticating a public key of a second device, the apparatus including: an authentication information receiving unit for receiving the public key of the second device and a first value from the second device, wherein the first value is generated on the basis of the public key of the second device and a password displayed on a screen of the second device; an authentication value generating unit for generating a second value on the basis of the public key of the second device and a password input to the first device by a user of the first device according to the password displayed on the screen of the second device; and an authenticating unit for authenticating the public key of the second device on the basis of the first value and the second value.

According to an aspect of another exemplary embodiment, there is provided an apparatus for authenticating a public key of a second device for authenticating a public key of a first device, the apparatus including: an authentication information receiving unit for receiving the public key of the first device and a third value, generated on the basis of the public key of the first device and a password input to the first device by a user of the first device according to a password displayed on a screen of the second device, from the first device; an authentication value generating unit for generating a fourth value on the basis of the public key of the first device and the password displayed on the screen of the second device; and an authenticating unit for authenticating the public key of the first device on the basis of the third value and the fourth value.

According to an aspect of another exemplary embodiment, there is provided a computer-readable recording medium having embodied thereon a computer program for executing the method.

BRIEF DESCRIPTION OF THE DRAWINGS

The above and/or other aspects will become more apparent by describing in certain exemplary embodiments with reference to the accompanying drawings, in which:

FIG. 1 is a flowchart of a method of authenticating public keys between two devices, according to an exemplary embodiment;

FIG. 3 is a flowchart of a method in which a first device authenticates a public key of a second device, according to an exemplary embodiment;

FIG. 4 is a flowchart of a method in which a second device authenticates a public key of a first device, according to an exemplary embodiment;

DETAILED DESCRIPTION OF EXEMPLARY EMBODIMENTS

Figure 2A:
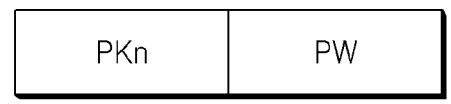
FIGS. 2A and 2B illustrate information for authenticating a public key, according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters.

FIG. 1 is a flowchart for describing a method of authenticating public keys between two devices, according to an exemplary embodiment.

Referring to FIG. 1, in operation 110, each of a first device 500 and a second device 600 generates a public key and a personal key corresponding to the public key. The first device generates its own public key PK1 and a personal key SK1 corresponding to the public key PK1. The second device generates its own public key PK2 and a personal key SK2 corresponding to the public key PK2. A method of generating the public keys PK1 and PK2 and the personal keys SK1 and SK2 is not limited, but the public keys PK1 and PK2 and the personal keys SK1 and SK2 may be generated according to a Rivest Shamir Adleman (RSA) algorithm as an example.

In operation 112, the first device informs the second device about starting authentication of a public key. A user of the first device executes an application for authenticating the public key in the first device to inform the second device about the starting of the authentication of the public key.

However, the user does not need to inform the second device about the starting authentication of the public key through the first device, and the user may start authentication of the public key by operating at least one of the first device and the second device. For example, the user may execute an application related to the authentication of the public key in the first device, and at the same time, may also execute an application related to the authentication of the public key in the second device, to execute the authentication operations described in detail below.

In operation 114, the second device displays a predetermined password PW on a screen of the second device. For example, only the device of a user watching the screen of the second device may authenticate the public key. The second device may arbitrarily generate the password PW.

In operation 116, the user of the first device reads the password PW displayed on the screen of the second device, and inputs the password PW in the first device through an input device of the first device. The input device may include various devices, for example, a button, a touch pad, a keyboard, and the like.

In operation 118, the second device generates a predetermined hash value H2 based on the public key PK2 of the second device, a predetermined random number R2, and the password PW displayed on the screen of the second device, and transmits the predetermined hash value H2 to the first device. A predetermined hash function may be applied to a bitstream formed by concatenating the public key PK2, the predetermined random number R2, and the password PW with one another, to generate the hash value H2. Since the password PW is used to generate the hash value H2, only a device that knows the password PW may authenticate the public key.

The random number R2 is used to further add arbitrariness in a public key authentication process and may be a value generated arbitrarily by the second device. However, a hash function may be applied to a bitstream formed by concatenating the public key PK2 of the second device and the password PW with each other, without concatenating the random number R2, to generate the hash value H2, as described in detail below with reference to FIGS. 2A and 2B.

Figure 2B:
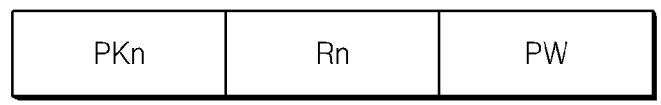

FIGS. 2A and 2B illustrate information for authenticating a public key, according to an exemplary embodiment.

For example, the hash value may be generated by concatenating a public key PKn and a password PW, shown in FIG. 2A. Accordingly, in operation 118, the second device may use a bitstream formed by concatenating a public key PK2 and a password PW with each other, to generate the hash value H2 to be transmitted to the first device. The hash value H2 may be generated as information for authenticating the public key by applying a hash function to the bitstream formed by concatenating the public key and the password with each other.

As another example, the hash value may be generated by concatenating a public key PKn, a random number Rn, and a password PW, shown in FIG. 2B. Accordingly, in operation 118, the second device may use a bitstream in which a public key PK2, a random number R2, and a password PW are concatenated with one another, in order to generate the hash value H2 to be transmitted to the first device. The hash value H2 may be generated as information for authenticating the public key by applying a hash function to the bitstream formed by concatenating the public key, the random number, and the password with one another.

As described above with reference to FIGS. 2A and 2B, a method of generating a hash value using concatenation of data is an example for generating the hash value by using a public key, a random number, and a password. Thus, one of ordinary skill in the art would understand that various other methods of generating the hash value by combining the public key, the random number, and the password may be used. For example, the hash value may be generated after performing an exclusive OR (XOR) operation on bit values of the public key, the random number, and the password, or may be generated in a bitstream generated by adding up all of the bit values of the public key, the random number, and the password.

Referring back to FIG. 1, in operation 120, the first device generates a predetermined value H1 using the public key PK1 of the first device, a predetermined random number R1, and the password PW displayed on the screen of the second device, and transmits the predetermined value H1 to the second device. As described above with reference to operation 118, the hash value H1 may be generated by applying a hash function to a bitstream formed by concatenating the public key PK1 of the first device, the predetermined random number R1, and the password PW with one another. The hash function may be the same as the one used to generate the hash value H2 in operation 118.

The random number R1 may be used to further add arbitrariness in the public key authentication process, and may be a value generated arbitrarily by the first device. As illustrated in FIG. 2A, the hash value H1 may be generated by applying the hash function to a bitstream formed by concatenating the public key PK1 of the first device and the password PW with each other, without concatenating the random number R1.

The order of operations 118 and 120 may be different from the order illustrated in FIG. 1. Operation 120 may be performed before the operation 118, or alternatively, operations 118 and 120 may be performed at the same time.

In operation 122, the second device transmits the public key PK2 and the random number R2 of the second device, so that the first device may authenticate the public key PK2 of the second device. If the random number R2 is not used when generating the hash value H2 in operation 118, the second device does not transmit the random number R2.

In operation 124, the first device transmits the public key PK1 and the random number R1 of the first device, so that the second device may authenticate the public key PK1 of the first device. If the random number R1 is not used when generating the hash value H1 in operation 120, the first device does not transmit the random number R1.

The order of operations 122 and 124 may be different from the order illustrated in FIG. 1. For example, operation 124 may be performed before the operation 122, or alternatively, operations 122 and 124 may be performed at the same time.

In operation 126, the first device authenticates the public key PK2 of the second device. The first device may authenticate the public key PK2 of the second device by authenticating the hash value H2 received in operation 118. The public key PK2 of the second device and the random number R2 received in operation 122 are concatenated with the password PW that is input in operation 116 to generate a bitstream. A hash function that is the same as the one applied to generate the hash value H2 in operation 118 is applied to the generated bitstream to generate a hash value H3. The hash value H2 may be authenticated by determining whether the generated hash value H3 is the same as the hash value H2 received in operation 118. If the hash value H3 is the same as the hash value H2, the public key PK2 of the second device is authenticated.

In operation 128, the second device authenticates the public key PK1 of the first device. The public key PK1 of the first device may be authenticated by authenticating the hash value H1 received in operation 120. The public key PK1 of the first device and the random number R1 received in operation 124 are concatenated with the password PW displayed on the screen of the second device in operation 114 to generate a bitstream. A hash function that is the same as the one applied to generate the hash value H1 in operation 120 is applied to the generated bitstream to generate a hash value H4. The hash value H1 may be authenticated by determining whether the generated hash value H4 is the same as the hash value H1 received in operation 120. If the hash value H4 is the same as the hash value H1, the public key PK1 of the first device is authenticated.

In operation 130, the first device generates a signature value S1 of the first device. After the public key authentication process according to the present exemplary embodiment is completed, the signature value S1 is generated for an electronic signature required to transmit and receive data according to the authenticated public key. The signature value may be generated using the personal key SK1 of the first device and the public key PK2 of the second device authenticated in operation 126.

An example in which the public key of the first device is generated according to the above-mentioned RSA algorithm is described in detail below.

The public key PK1 of the first device may be generated according to the RSA algorithm as:

$$PK1=(e1, N1),$$

where N1 is a value obtained by multiplying a large prime number p1 by a large prime number q1, and e1 and $(p1-1)*(q1-1)$ share no divisors other than 1.

The personal key SK1 of the first device is determined to satisfy:

$$e1*SK1 \bmod (p1-1)*(q1-1)=1$$

For example, the first device may generate the signature value S1 as $S1=PK2^{SK1} \bmod(N1)$ by using the public key PK2 of the second device. As another example, the first device may use a hash value m1=hash (PK2) generated by applying a predetermined hash function to the public key PK2 of the second device, and generate the signature value S1 of the first device as $S1=m1^{SK1} \bmod(N1)$ by using a hashed value of the public key PK2 of the second device instead of using the public key PK2 of the second device. The hash value m1 may also be generated by using additional characteristic information, for example, a serial number of the second device as m1=hash (PK2, Serial2).

In operation 132, the second device generates a signature value S2 of the second device. The signature value S2 may be generated using the personal key SK2 of the second device and the public key PK1 of the first device authenticated in operation 128.

The public key PK2 of the second device may be generated according to the RSA algorithm as:

$$PK2=(e2,N2),$$

where N2 is a value obtained by multiplying a large prime number p2 by a large prime number q2, and e2 and $(p2-1)*(q2-1)$ share no divisors other than 1.

The personal key SK2 of the second device is determined to satisfy:

$$e1*SK2 \bmod (p2-1)*(q2-1)=1$$

For example, the second device may generate the signature value S2 as $S2=PK1^{SK2} \bmod(N2)$ by using the public key PK1 of the first device. As another example, the second device may use a hash value m2=hash (PK1) generated by applying a predetermined hash function to the public key PK1 of the first device and generate the signature value S2 of the second device as $S2=m2^{SK2} \bmod(N2)$ by using a hashed value of the public key PK1 of the first device, instead of using the public key PK1 of the first device. The hash value m2 may also be generated by using additional characteristic information, for example, a serial number of the first device as m2=hash (PK1, Serial1).

In operation 134, the first device transmits the signature value S1 generated in operation 130 to the second device, and in operation 136, the second device transmits the signature value S2 generated in operation 130 to the first device.

In operation 138, the first device checks and stores the signature value S2 of the second device. The first device calculates a value $PK2'=S2^{e2}$ mod(N2), determines whether the value PK2' generated according to a result of the calculating is the same as the authenticated public key PK2 of the second device, and stores the signature value S2 of the second device based on determination. If the second device used the hash value m2=hash (PK2) when generating the signature value S2 in operation 132, the first device calculates a value $m2'=S2^{e2}$ mod(N2), determines whether the value m2' generated according to a result of the calculating is the same as the hash value m2, and stores the signature value S2 based on determination.

In operation 140, the second device checks and stores the signature value S1 of the first device. The second device calculates a value $PKV=S1^{e1}$ mod(N1), determines whether the value PK1' generated according to a result of the calculating is the same as the authenticated public key PK1 of the first device, and stores the signature value S1 of the first device based on determination. If the first device used the hash value m1=hash (PK1) when generating the signature value S1 in operation 130, the first device calculates a value $m1'=S1^{e1}$ mod(N1), determines whether the value m1' generated according to a result of the calculating is the same as the hash value m1, and stores the signature value S1 based on determination.

FIG. 3 is a flowchart for describing a method in which a first device authenticates a public key of a second device, according to an exemplary embodiment.

FIG. 1 illustrates a method in which the first device and the second device authenticate each other's public key in an authenticating process of one public key. However, the method in which the first device authenticates the public key of the second device and the method in which the second device authenticates the public key of the first device may be independently performed, as illustrated in FIGS. 3 and 4, respectively.

Referring to FIG. 3, in operation 310, the first device receives information to authenticate the public key of the second device, from the second device. The first device receives a first value generated using a password, which is displayed on a screen of the second device, and the public key of the second device. As described above with reference to operation 118 of FIG. 1, the first device may receive a first hash value, generated by applying a predetermined hash function to a bitstream formed by concatenating a password PW and a public key PK2 of the second device with each other, from the second device. Alternatively, the first hash value may be a value generated by applying a predetermined hash function to a bitstream formed by concatenating the password PW, the public key PK2 of the second device, and a predetermined random number R2 with one another.

The first device also receives the public key of the second device together with the first value in order to verify the first value. If a user of the first device may directly input the password PW, which is displayed on the screen of the second device, via the first device, the password PW does not need to be transmitted. If the first hash value is generated by applying a hash function to the bitstream formed by concatenating the password PW, the public key PK2 of the second device, and the random number R2 with one another, the first device may also receive the random number R2 together with the public key PK2 of the second device, as described in operation 122 of FIG. 1.

In operation 320, the first device generates a second value based on the password, which is input by the user, and the public key of the second device. When the user views the screen of the second device and directly inputs the password PW through an input device of the first device, a second hash value may be generated by applying a hash function to a bitstream formed by concatenating the input password PW and the public key PK2 of the second device received in operation 310 with each other. The first device generates the second hash value by applying a hash function that is the same as the one applied when generating the first hash value.

If the random number R2 is used when generating the first hash value, the random number R2 is also received in operation 310, and the second hash value is generated by applying the hash function to the bitstream formed by concatenating the input password PW, the public key PK2 of the second device, and the random number R2 with one another.

In operation 330, the first device authenticates the public key of the second device based on the first value received in operation 310 and the second value generated in operation 320. It is determined whether the first value received in operation 310 is the same as the second value generated in operation 320. If the first value received in operation 310 is the same as the second value generated in operation 320, the public key of the second device is authenticated.

In operation 340, the first device determines whether the public key of the second device is authenticated.

If the first value and the second value are the same and thus the public key of the second device is authenticated in operation 330, a signature value S1 of the first device is generated in operation 350. A method of generating the signature value S1 of the first device is described above with reference to operation 130 of FIG. 1.

In operation 360, the first device transmits the first signature value generated in operation 350.

FIG. 4 is a flowchart for describing a method in which a second device authenticates a public key of a first device, according to an exemplary embodiment.

Referring to FIG. 4, in operation 410, the second device receives information to authenticate the public key of the first device, from the first device. The second device receives a third value generated based on the public key of the first device and a password, which is input to the first device by a user according to a password displayed on a screen of the second device, from the first device. As described above with reference to operation 120 of FIG. 1, the second device may receive a third hash value, generated by applying a predetermined hash function to a bitstream formed by concatenating the password PW input by the user and the public key PK1 of the first device with each other, from the first device. Alternatively, the third hash value may be a value generated by applying a predetermined hash function to a bitstream formed by concatenating the password PW input by the user, the public key PK1 of the first device, and the predetermined random number R1 with one another.

The second device also receives the public key of the first device together with the third value in order to verify the third value. The password used to generate the third value is the password displayed on the screen of the second device, which is input by a user to the first device, and thus the second device does not need to additionally receive the password. If the third hash value is generated by applying a hash function to the bitstream formed by concatenating the password PW, the public key PK1 of the first device, and the random number R1 with one another, the second device may also receive the random number R1 together with the public key PK1 of the first device, as described above with reference to operation 124 of FIG. 1.

In operation 420, the second device generates a fourth value based on the public key of the first device and the password displayed on the screen of the second device. A fourth hash value is generated by applying a hash function to a bitstream formed by concatenating the password displayed on the screen of the second device and the public key PK1 of the first device received in operation 410 with each other. The fourth hash value is generated by applying a hash function that is the same as the one applied when the first device generates the third hash value.

If the first device used the random number R1 when generating the third hash value, the second device receives the random number R1 in operation 410, and the fourth hash value is generated by applying the hash function to the bitstream formed by concatenating the password PW displayed on the screen, the public key PK1 of the first device, and the random number R1 with one another.

In operation 430, the second device authenticates the public key of the first device based on the third value received in operation 410 and the fourth value generated in operation 420. It is determined whether the third value received in operation 410 is the same as the fourth value generated in operation 420. If the third value received in operation 410 is the same as the fourth value generated in operation 420, the public key of the first device is authenticated.

In operation 440, the second device determines whether the public key of the first device is authenticated in operation 430.

If the third value and the fourth value are the same and thus the public key of the first device is authenticated in operation 430, a signature value S2 of the second device is generated in operation 450. A method of authenticating the signature value S2 of the second device is described above with reference to operation 132 of FIG. 1.

In operation 460, the second device transmits the second signature value S2 generated in operation 450 to the first device.

Figure 5:
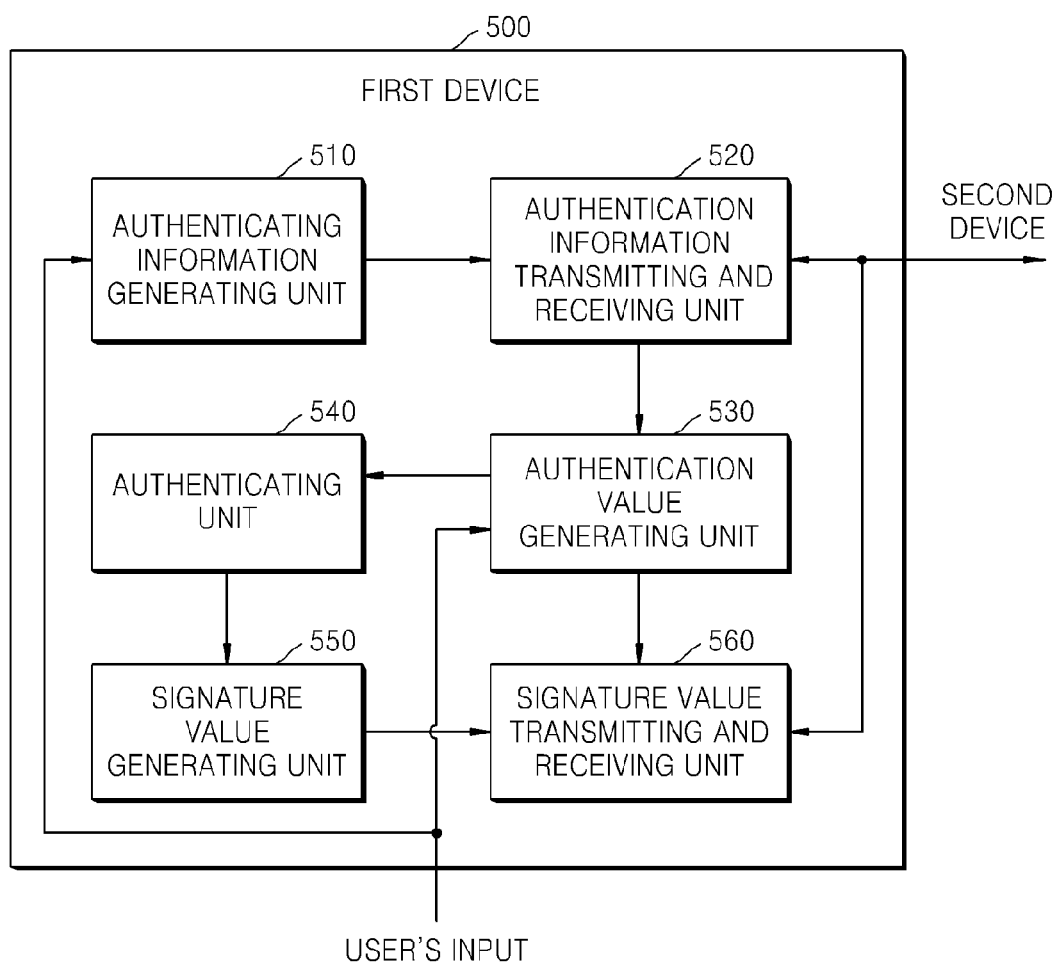
FIG. 5 is a block diagram of a first device according to an exemplary embodiment.

FIG. 5 is a block diagram of a first device according to an exemplary embodiment.

Referring to FIG. 5, a first device 500 includes an authenticating information generating unit 510, an authentication information transmitting and receiving unit 520, an authentication value generating unit 530, an authenticating unit 540, a signature value generating unit 550, and a signature value transmitting and receiving unit 560.

The authenticating information generating unit 510 generates authentication information for a second device 600 to authenticate a public key of the first device 500. In operation 120 of FIG. 1, the first device 500 generates a value H1 to be transmitted to the second device 600. The first device 500 generates a predetermined value H1 based on a password, input by a user of the first device 500 according to a password displayed on a screen of the second device 600, and a public key of the first device 500. A hash value H1 may be generated by applying a hash function to a bitstream formed by concatenating the password, which is input by the user, and the public key of the first device 500 with each other, or by applying a hash function to a bitstream formed by concatenating the password input by the user, the public key of the first device 500, and a predetermined random number R1 with one another.

The authentication information transmitting and receiving unit 520 transmits the information generated in the authenticating information generating unit 510 to the second device 600. The authentication information transmitting and receiving unit 520 transmits the hash value H1 to the second device 600. The authentication information transmitting and receiving unit 520 transmits the public key of the first device 500 and the random number R1 together to the second device 600.

Also, the authentication information transmitting and receiving unit 520 receives information to authenticate a public key of the second device 600, from the second device 600. The authentication information transmitting and receiving unit 520 receives a predetermined value H2 generated based on the password displayed on the screen of the second device 600 and the public key of the second device 600. The received predetermined value H2 may be a hash value generated by applying a hash function to a bitstream formed by concatenating the password displayed on the screen of the second device 600 and the public key of the second device 600 with each other. Alternatively, the received predetermined value H2 may be a hash value generated by applying a hash function to a bitstream formed by concatenating the password displayed on the screen of the second device 600, the public key of the second device 600, and the random number R2 with one another. Also, the authentication information transmitting and receiving unit 520 may receive the public key of the second device 600 and the random number R2 together from the second device 600.

The authentication value generating unit 530 generates an authentication value used to authenticate the predetermined value H2 which the authentication information transmitting and receiving unit 520 received from the second device 600. The authentication value generating unit 530 generates an authentication value H3 based on the password, which is input to the first device 500 by a user according to the password displayed on the screen of the second device 600, and the public key PK2 of the second device 600. A method of authenticating the authentication value H3 is described above with reference to operation 126 of FIG. 1.

The authenticating unit 540 determines whether the predetermined value H2 which the authentication information transmitting and receiving unit 520 received from the second device 600 is the same as the authentication value H3 generated in the authentication value generating unit 530. If the predetermined value H2 is the same as the authentication value H3, the public key of the second device 600 is authenticated. Otherwise, the public key of the second device 600 is not authenticated.

If the public key of the second device 600 is authenticated, the signature value generating unit 550 generates a signature value S1 of the first device 500 based on the public key of the authenticated second device 600. A method of generating the signature value S1 is described above with reference to operation 130 of FIG. 1.

The signature value transmitting and receiving unit 560 transmits the signature value S1 of the first device 500 generated in the signature value generating unit 550 to the second device 600. Also, the signature value transmitting and receiving unit 560 may receive a signature value S2 which the second device 600 authenticates and transmits the public key of the first device 500, and may check and store the signature value S2. The checking and storing of the signature value S2 is described above with reference to operation 138 of FIG. 1.

Figure 6:
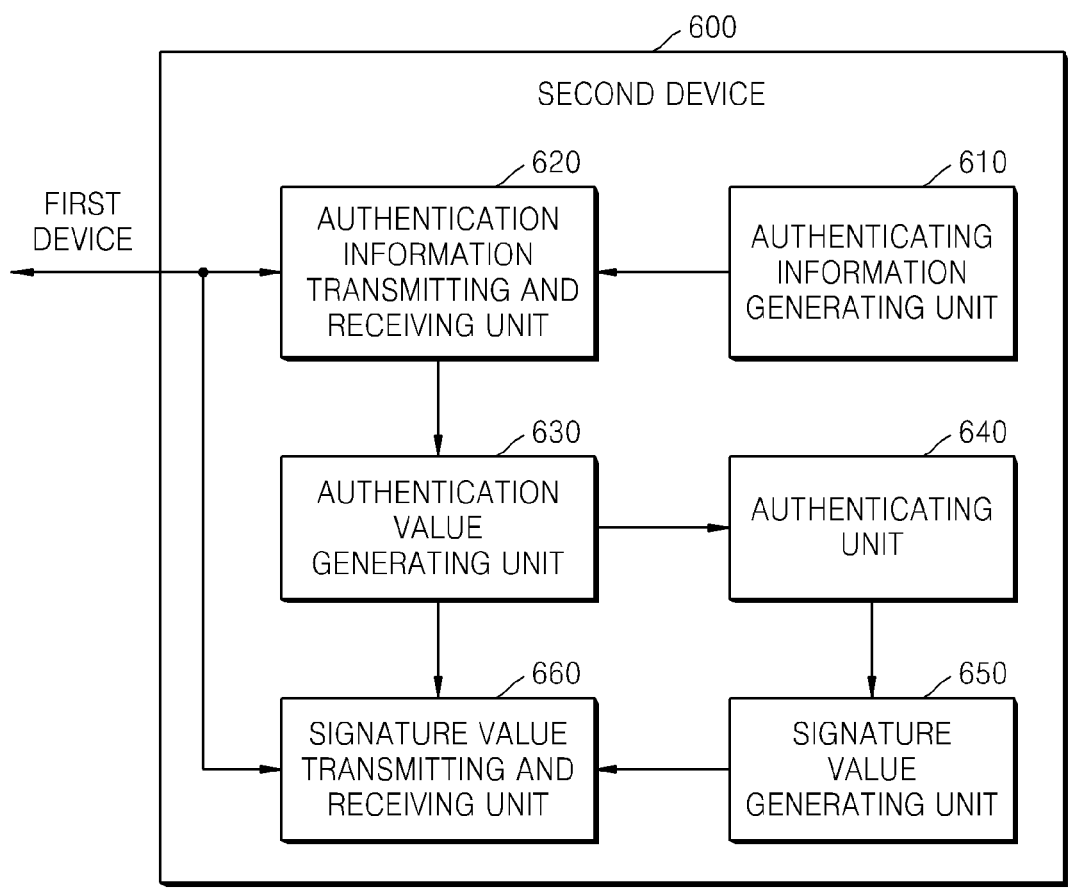
FIG. 6 is a block diagram of a second device according to an exemplary embodiment.

FIG. 6 is a block diagram of the second device 600 according to an exemplary embodiment.

Referring to FIG. 6, the second device 600 includes an authenticating information generating unit 610, an authentication information transmitting and receiving unit 620, an authentication value generating unit 630, an authenticating unit 640, a signature value generating unit 650, and a signature value transmitting and receiving unit 660.

The authenticating information generating unit 610 generates authentication information for the first device 500 to authenticate the public key of the second device 600. In operation 118 of FIG. 1, the second device 600 generates a value H2 to be transmitted to the first device 500. The second device 600 generates a predetermined value H2 based on a password displayed on a screen of the second device 600 and a public key of the second device 600. A hash value H2 may be generated by applying a hash function to a bitstream formed by concatenating the password, which is displayed on the screen of the second device 600, and the public key of the second device 600 with each other, or by applying a hash function to a bitstream formed by concatenating the password displayed on the screen of the second device 600, the public key of the second device 600, and a predetermined random number R2 with one another.

The authentication information transmitting and receiving unit 620 transmits the information generated in the authenticating information generating unit 610 to the first device 500. The authentication information transmitting and receiving unit 620 transmits the predetermined value H2 to the first device 500. The authentication information transmitting and receiving unit 620 transmits the public key of the second device 600 and the random number R2 together to the first device 500.

Also, the authentication information transmitting and receiving unit 620 receives information to authenticate a public key of the first device 500, from the first device 500. The authentication information transmitting and receiving unit 620 receives a predetermined value H1 generated based on the password, which is input to the first device 500 by a user according to the password displayed on the screen of the second device 600, and the public key of the first device 500. The received predetermined value H1 may be a hash value generated by applying a hash function to a bitstream formed by concatenating the password, which is input by the user, and the public key of the first device 500 with each other. Alternatively, the received predetermined value H1 may be a hash value generated by applying a hash function to a bitstream formed by concatenating the password input by the user, and the public key of the first device 500, and the random number R1 with one another. Also, the authentication information transmitting and receiving unit 620 may receive the public key of the first device 500 and random number R1 of the first device 500 together from the first device 500.

The authentication value generating unit 630 generates an authentication value used to authenticate the predetermined value H1 which the authentication information transmitting and receiving unit 620 received from the first device 500. The authentication value generating unit 630 generates an authentication value H4 based on the password, which is displayed on the screen of the second device 600, and the public key PK1 of the first device 500. A method of generating the authentication value H4 is described above with reference to operation 128 of FIG. 1.

The authenticating unit 640 determines whether the predetermined value H1 which the authentication information transmitting and receiving unit 620 received from the first device 500 is the same as the authentication value H4 generated in the authentication value generating unit 630. If the predetermined value H1 is the same as the authentication value H4, the public key of the first device 500 is authenticated. Otherwise, the public key of the first device 500 is not authenticated.

If the public key of the first device 500 is authenticated, the signature value generating unit 650 generates a signature value S2 of the second device 600 based on the public key of the authenticated first device 500. A method of generating the signature value S2 is described above with reference to operation 132 of FIG. 1.

The signature value transmitting and receiving unit 660 transmits the signature value S2 of the second device 600 generated in the signature value generating unit 650 to the first device 500. Also, the signature value transmitting and receiving unit 660 may receive the signature value S1 of the first device 500 that authenticates and transmits the public key of the second device 600, and may check and store the signature value S1. The checking and storing of the signature value S1 is described above with reference to operation 140 of FIG. 1.

According to exemplary embodiments, a public key can be authenticated without an additional authentication server, thereby more effectively authenticating the public key required to communicate between devices that cannot include an additional server for authentication of a public key. Furthermore, since the public key is authenticated based on a password displayed on a screen of the device, the device incapable of seeing the password displayed on the screen cannot authenticate the public key, thereby greatly improving security of authentication of the public key.

For example, an apparatus for authenticating a public key according to an exemplary embodiment may include a bus coupled to units of each device illustrated in FIGS. 5 and 6 and at least one processor coupled to the bus. Also, the apparatus may include a memory coupled to the bus to store commands, a received message, or a generated message and coupled to the processor for performing the above commands.

A system according to exemplary embodiments can also be embodied as computer-readable code on a computer-readable recording medium. The computer-readable recording medium may include a data storage device that can store data which can be thereafter read by a computer system. Examples of the computer-readable recording medium include read-only memory (ROM), random-access memory (RAM), CD_ROMs, magnetic tapes, floppy disks, optical data storage devices, and etc. The computer-readable recording medium can also be distributed over network coupled computer systems so that the computer-readable code is stored and executed in a distributed fashion.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method in which a first device authenticates a public key of a second device, the method comprising:
    receiving, from a user of the first device, an input of a password displayed on a screen of the second device;
    receiving, from the second device, a first value generated based on the public key of the second device, a random number, and the password, and the public key of the second device, in response to the user of the first device inputting the password displayed on the screen of the second device;
    generating a second value based on the public key of the second device, the random number, and the password, in response to the user of the first device inputting the password displayed on the screen of the second device; and
    authenticating the public key of the second device based on the first value and the second value,
    wherein the random number is randomly generated to be different from the password.

2. The method of claim 1, wherein the first value comprises a first hash value generated by applying a hash function to a bitstream in which the password displayed on the screen of the second device, the public key of the second device, and the random number are concatenated with one another.

3. The method of claim 2, wherein the second value comprises a second hash value generated by applying the hash function to a bitstream formed by concatenating the password input to the first device by the user of the first device, the public key of the second device, and the random number received from the second device with one another.

4. The method of claim 1, further comprising:
generating a first signature value for an electronic signature based on the authenticated public key of the second device and a personal key corresponding to a public key of the first device, according to a result of the authenticating; and
transmitting the generated first signature value to the second device.

5. A method in which a second device authenticates a public key of a first device, the method comprising:
displaying a password on a screen of the second device;
receiving, from the first device, the public key of the first device and a first value generated based on the public key of the first device, a random number, and the password, in response to the user of the first device inputting the password displayed on the screen of the second device;
generating a second value based on the received public key of the first device, the random number, and the password displayed on the screen of the second device; and
authenticating the public key of the first device based on the first value and the second value,
wherein the random number is randomly generated to be different from the password.

6. The method of claim 5, wherein the first value comprises a first hash value generated by applying a hash function to a bitstream formed by concatenating the password input to the first device by the user of the first device according to the password displayed on the screen of the second device, the public key of the first device, and the random number with one another.

7. The method of claim 6, wherein the second value comprises a second hash value generated by applying the hash function to a bitstream formed by concatenating the password displayed on the screen of the second device, the public key of the first device, and the random number with one another.

8. The method of claim 5, further comprising:
generating a second signature value for an electronic signature based on the authenticated public key of the first device and a personal key corresponding to the public key of the second device, according to a result of the authenticating; and
transmitting the generated second signature value to the second device.

9. The method of claim 1, wherein the first device is disposed in a physical proximity to the screen of the second device, so that the password displayed on the screen of the second device is seen by the user of the first device, and is input, by the user of the first device, into the first device.

10. An apparatus for authenticating, by a first device, a public key of a second device, the apparatus comprising:
an input device configured to receive, from a user of the first device, an input of a password displayed on a screen of the second device;
an authentication information receiving unit which receives, from the second device, the public key of the second device and a first value generated based on the public key of the second device, a random number, and the password, in response to the user of the first device inputting the password displayed on the screen of the second device;
an authentication value generating unit which generates a second value based on the public key of the second device, the random number, and the password, in response to the user of the first device inputting the password displayed on the screen of the second device; and
an authenticating unit which authenticates the public key of the second device based on the first value and the second value,
wherein the random number is randomly generated to be different from the password.

11. The apparatus of claim 10, wherein the first value comprises a first hash value generated by applying a hash function to a bitstream formed by concatenating the password displayed on the screen of the second device, the public key of the second device, and the random number with one another.

12. The apparatus of claim 11, wherein the second value comprises a second hash value generated by applying the hash function to a bitstream formed by concatenating the password input to the first device by the user of the first device, the public key of the second device, and the random number received from the second device with one another.

13. The apparatus of claim 10, further comprising:
a signature value generating unit which generates a first signature value for an electronic signature based on the authenticated public key of the second device and a personal key corresponding to the public key of the first device, according to a result of the authenticating; and
a signature value transmitting and receiving unit which transmits the generated first signature value to the second device.

14. An apparatus for authenticating, by a second device, a public key of a first device, the apparatus comprising:
a screen of the second device configured to display a password to be input by a user of the first device;
an authentication information receiving unit which receives, from the first device, the public key of the first device and a first value, generated based on the public key of the first device, a random number, and a password, in response to the user of the first device inputting the password displayed on the screen of the second device;
an authentication value generating unit which generates a second value based on the received public key of the first device, the random number, and the password displayed on the screen of the second device; and
an authenticating unit which authenticates the public key of the first device based on the first value and the second value,
wherein the random number is randomly generated to be different from the password.

15. The apparatus of claim 14, wherein the first value comprises a first hash value generated by applying a hash function to a bitstream formed by concatenating the password input to the first device by the user of the first device according to the password displayed on the screen of the second device, the public key of the first device, and the random number with one another.

16. The apparatus of claim 15, wherein the second value comprises a second hash value generated by applying the hash function to a bitstream formed by concatenating the password displayed on the screen of the second device, the public key of the first device, and the random number received from the first device with one another.

17. The apparatus of claim 14, further comprising:
a signature value generating unit which generates a second signature value for an electronic signature based on the authenticated public key of the first device and a personal key corresponding to the public key of the second device, according to a result of the authenticating; and
a signature value transmitting and receiving unit which transmits the generated second signature value to the second device.

18. A non-transitory computer-readable recording medium having embodied thereon a computer program for executing the method of claim 1.

19. A non-transitory computer-readable recording medium having embodied thereon a computer program for executing the method of claim 5.

20. A method comprising:
initiating an authentication process between first and second devices;
displaying a password on a screen of the second device;
entering the displayed password into the first device;
generating, by the second device, a first hash value based on the password, a random number, and a public key of the second device;
transmitting, by the second device, the first hash value and the public key of the second device, in response to the password being entered into the first device;
generating a second hash value based on the received public key of the second device, the random number, and the entered password, by the first device;
comparing, by the first device, the first hash value received from the second device and the second hash value generated by the first device; and
authenticating, by the first device, the public key of the second device based on the comparing,
wherein the random number is randomly generated to be different from the password.

21. The method of claim 20, further comprising:
generating, by the first device, a third hash value based on the entered password and a public key of the first device;
transmitting the third hash value and the public key of the first device, by the first device;
generating a fourth hash value based on the received public key of the first device and the password, by the second device;
comparing, by the second device, the third hash value received from the first device and the fourth hash value generated by the second device; and
authenticating, by the second device, the public key of the first device based on the comparing.

* * * * *